B. PHELAN.
SAFETY WHEEL OR SUPPORT FOR VELOCIPEDES.
APPLICATION FILED JULY 2, 1912.
1,054,237.  Patented Feb. 25, 1913.
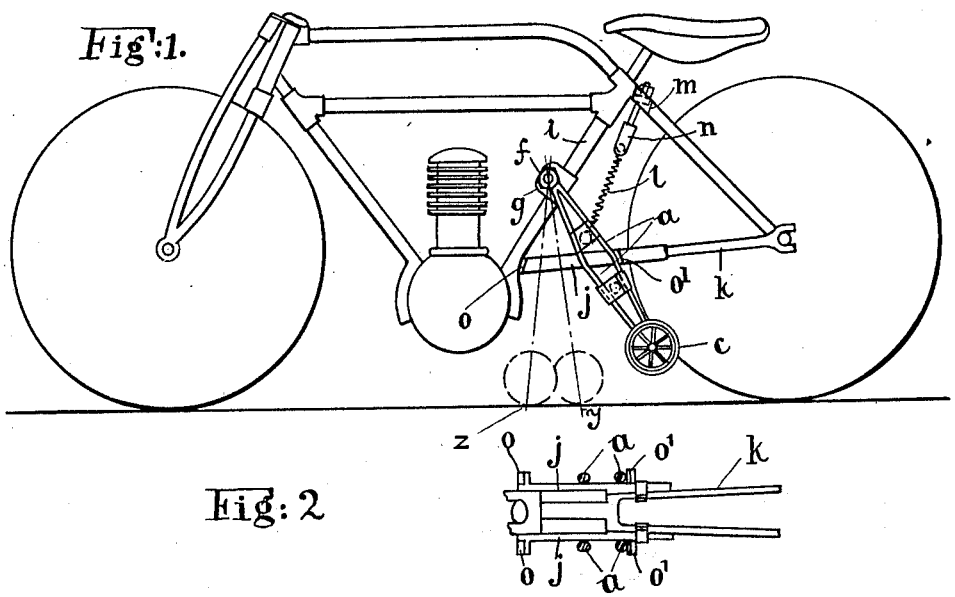
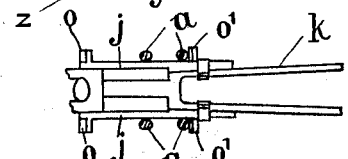
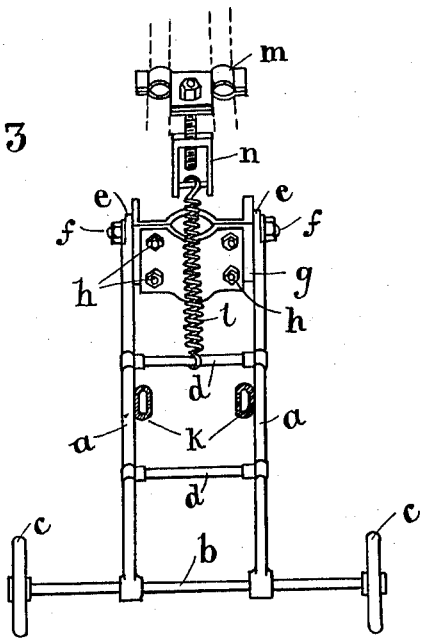
Witnesses
C. A. Walter
L. G. Anger
Inventor
Bryan Phelan
by R. Huddam
Attorney

UNITED STATES PATENT OFFICE.

BRYAN PHELAN, OF LONDON, ENGLAND.

SAFETY WHEEL OR SUPPORT FOR VELOCIPEDES.

1,054,237.  Specification of Letters Patent.  Patented Feb. 25, 1913.

Application filed July 2, 1912. Serial No. 707,177.

*To all whom it may concern:*

Be it known that I, BRYAN PHELAN, a subject of the King of England, residing at London, in England, have invented certain new and useful Improvements in Safety Wheels or Supports for Velocipedes, of which the following is a specification.

This invention relates to safety wheels or supports particularly for motor driven bicycles and comprises an improved construction thereof for retaining the bicycle in an upright position either when in motion or when in a state of rest, and preventing same from falling due to side slipping or skidding or other accidental causes.

The object of the present invention is to provide a novel construction or variation of a support such as described in the specification of my prior Patent No. 628,548 dated July 11th 1899, which is more particularly adapted to be readily applied to most types of motor cycles as at present constructed. As in the said prior construction and others known to me, the support is constructed chiefly of metal tubing and consists of auxiliary wheels or runners mounted on vertical members which are pivoted to part of the cycle frame, the entire support being under the action of a spring or equivalent tending to hold the runners clear of the ground.

The present invention consists in pivoting the vertical members at their upper ends to the saddle-pillar-tube of the velocipede frame and in guiding said members in their movements by causing them to slidably engage the outer surfaces of the usual horizontal rear lower forks of the velocipede or horizontal members attached to the outer surfaces of said forks.

An embodiment of the invention is shown in the accompanying drawings in which—

Figure 1 is a side elevation showing the improved device applied to a conventional form of motor-cycle. Fig. 2 is a detail sectional plan view showing guides hereinafter referred to and Fig. 3 is a rear elevation, with parts of the frame in section and the rear wheel omitted, of a modification wherein the guides on the lower forks are dispensed with.

In said drawings $a$ designates the vertical members of the support, $b$ a cross member thereof and $c$ runners revolubly mounted on the ends of said cross member.

In the construction illustrated the vertical members $a$ connected to the cross member $b$ each consist of two parts, such as castings or tubes, curving outward in one plane from the cross-member $b$ and curving again inward at their upper ends, thus forming a widened central portion, and said vertical members are laterally separated from each other for substantially their entire length and connected together at intervals by cross bolts or stays $d$.

At their upper ends the vertical members $a$ are each formed with a bearing $e$ for a pivot-bolt or equivalent $f$ which traverses a bearing member $g$ rigidly attached as by bolts $h$ to the saddle pillar tube $i$ of the cycle frame or any other form of pivotal connection between the upper ends of said vertical members and said frame tube may be provided. Parallel guiding members $j$ are secured to the rear lower forks $k$ of the cycle against the outside of which the vertical members $a$ of the support bear, to afford an additional bearing or point of support for said vertical members between the pivot and their free ends, and the support as a whole is under the action of a spring $l$ or equivalent, one end of which is shown as attached to one of the cross bolts $d$ below the pivotal point of the support and the other end to the rear frame tubes of the cycle by means of a clip $m$ and shackle $n$. If necessary that part of the cross member $b$ between the vertical members $a$ may be bent, curved or otherwise shaped or even dispensed with in order to provide room for passage of the rear wheel of the cycle. Stops $o$ $o^1$ may be provided on the guide members $j$ to limit the movement of the support in either direction.

From the above description it will be seen that the present support is pivoted at its upper end instead of between its ends as formerly and comprises a strong structure, the vertical members $a$ of which may each consist of one or more parts, the members being at a sufficient distance apart to pass outside and be efficiently guided by the usual rear lower forks or parts attached thereto and being rigidly connected together by cross bolts or the like, this producing a structure capable of withstanding side strains caused by the runners encountering obstacles or coming alternately into contact with the ground.

When the support is not in use the runners are held clear of the ground in the position shown in full lines by means of the spring $l$ aforesaid and to bring the support into operation, that is to say into the position $y$ shown in broken lines, in the case of a motor cycle, the cross member $b$ may be pressed downward by the feet of the rider, no positive holding means being necessary during motion and this action permits of the rider controlling the runners according to requirements. When, however, it is desired to support the cycle with the rider dismounted, viz., in the position $z$ shown in broken lines, the support can either be held in this position by abutting against the stop $o$ or may be retained at any height between its extremes of movement by any appropriate holding means, capable of being brought into action and released by suitable devices.

What I claim as my invention and desire to secure by Letters Patent of the United States is:—

1. The combination with the saddle-pillar-tube and rear horizontal forks of a cycle, of a safety support comprising vertical members each pivoted at its upper end to said saddle-pillar-tube and in sliding engagement intermediate its ends with the guiding surface on one of said rear forks, a wheel revolubly mounted at the lower end of each vertical member and a spring adapted to normally hold said vertical members out of supporting position, substantially as described.

2. The combination with the saddle-pillar-tube and rear horizontal forks of a cycle, of a safety support comprising vertical members, a wheel revolubly mounted at the lower end of each vertical member, a bearing carried by the saddle-pillar-tube to each side of which the upper end of one of said vertical members is pivoted, a guide member secured to the outer surface of each fork with which a vertical support member slidably engages, and a spring adapted to normally hold said vertical members out of supporting position, substantially as described.

3. The combination with the saddle-pillar-tube and rear horizontal forks of a cycle, of a safety support comprising vertical members, transverse braces connecting the latter, a transverse member extending laterally from the lower end of each vertical member, a wheel revolubly mounted on each transverse member, means for pivoting the upper end of the vertical members to the saddle-pillar-tube on opposite sides thereof, means on said rear fork adapted to engage said vertical members upon their inner faces intermediate the ends thereof, and a spring adapted to normally hold said vertical members out of supporting position, substantially as described.

4. A safety support for cycles, comprising vertical members spaced apart throughout substantially their entire length sufficiently to extend outside and slidably engage intermediate their ends with the lower rear forks of a cycle, transverse braces connecting said vertical members, means for pivoting the said members at their extreme upper ends to the saddle-pillar-tube of a cycle; a transverse member extending outward laterally from the lower end of each vertical member, and a wheel revolubly mounted on the outer end of each transverse member, substantially as described.

In witness whereof I have signed this specification in the presence of two witnesses.

BRYAN PHELAN.

Witnesses:
R. WESTACOTT,
H. D. JAMESON.

---

Copies of this patent may be obtained for five cents each, by addressing the "Commissioner of Patents, Washington, D. C."